Inventor:
Antal Csicsatka,
by Norman C. Fulmer
His Attorney.

Feb. 25, 1964 A. CSICSATKA 3,122,610

CIRCUITRY FOR MULTIPLEX TRANSMISSION OF FM STEREO SIGNALS WITH PILOT SIGNAL

Filed July 22, 1960 6 Sheets-Sheet 2

Inventor:
Antal Csicsatka,
by Norman C. Fulmer
His Attorney.

Inventor:
Antal Csicsatka,
by Norman C. Fulmer
His Attorney.

Inventor:
Antal Csicsatka,
by Norman C. Fulmer
His Attorney.

Inventor:
Antal Csicsatka,
by Norman C. Fulmer
His Attorney.

Inventor:
Antal Csicsatka,
by Norman C. Fulmer
His Attorney.

United States Patent Office 3,122,610 Patented Feb. 25, 1964

3,122,610

CIRCUITRY FOR MULTIPLEX TRANSMISSION OF FM STEREO SIGNALS WITH PILOT SIGNAL

Antal Csicsatka, Utica, N.Y., assignor to General Electric Company, a corporation of New York Filed July 22, 1960, Ser. No. 44,732
19 Claims. (Cl. 179—15)

This invention relates to systems for the transmission of multiplex signals, particularly to systems for the transmission of stereophonically related signals by means of frequency modulation broadcasting, and to transmitter and receiver circuitry for use in such systems.

Stereophonic broadcasting systems comprise a transmitter to which is fed a signal representing a Left (or "L") channel and a signal representing a Right (or "R") channel, and the transmitter converts these stereophonically related L and R signals into suitable electrical signals for transmission to one or more receivers of the system. The receivers convert the received signals into L and R electrical signals which are respectively fed to suitably placed L and R loudspeakers for recreating L and R sound corresponding to the L and R signals that were fed to the transmitter. The L and R signals fed to the transmitter may be sound signals picked up by microphones, or signals recorded on a medium such as magnetic tape or phonograph records.

An object of the invention is to provide a multiplex system, and circuitry therefor, having an improved signal-to-noise ratio.

Another object is to provide a stereophonic broadcasting system in which conventional high-quality frequency modulation receivers and tuners can be adapted, relatively simply and inexpensively, for receiving and utilizing stereophonically related signals.

A further object is to provide a stereophonic broadcasting system that is relatively simple and inexpensive, and which achieves improved efficiency.

Another object is to provide a stereophonic broadcasting system wherein the dynamic balance of the received signals is stable.

A still further object is to provide a stereophonic broadcasting system having improved fidelity and wherein the reproduced stereo signals at the receiver have equally good fidelity.

Yet another object is to provide a system for broadcasting a stereophonic signal accompanied by a commercial program signal.

Still other objects will be apparent from the following disclosure and claims, and from the drawing in which:

Figures 1, 7:
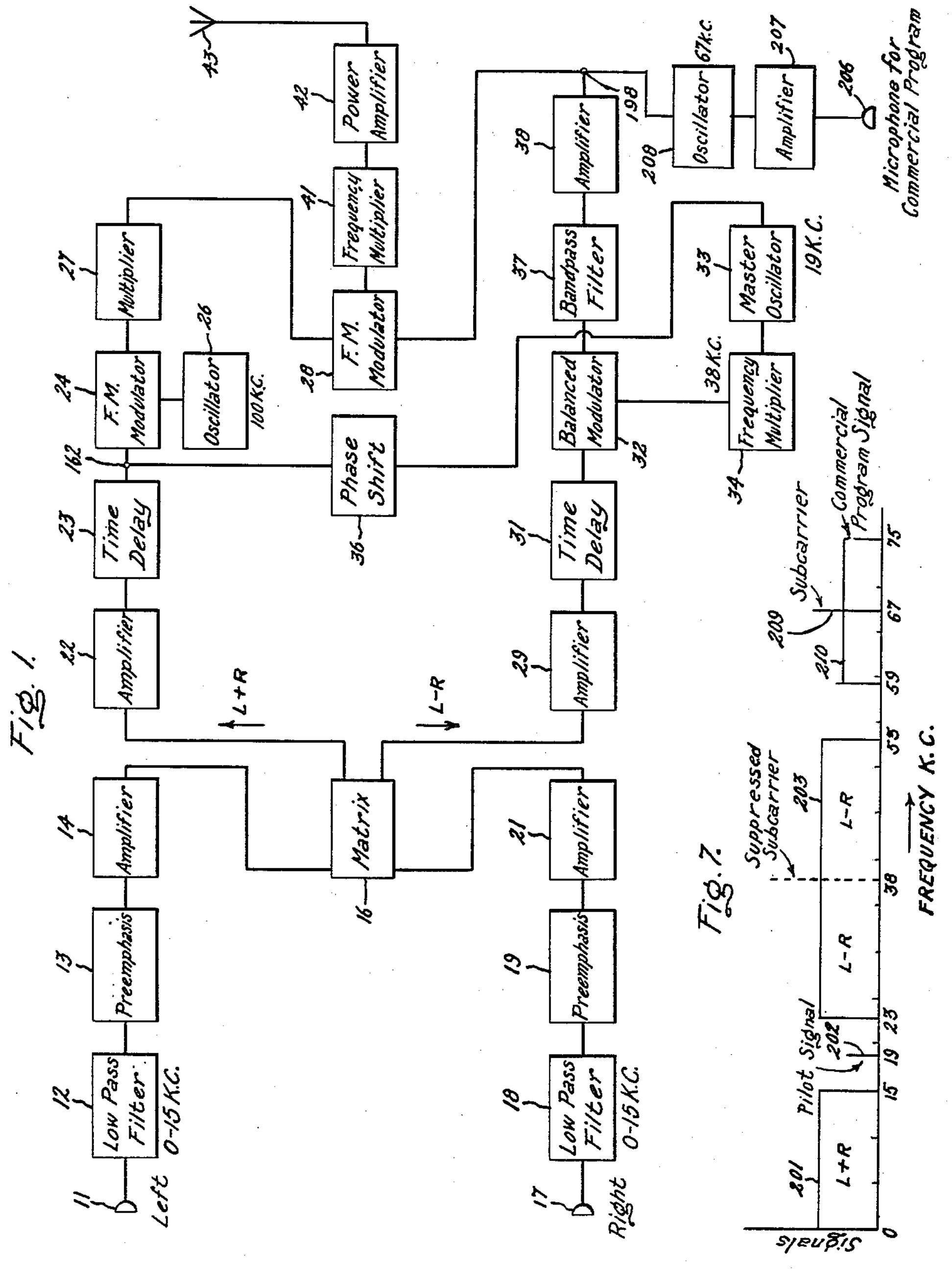
FIGURE 1 is an electrical diagram, in block form, of a preferred embodiment of a transmitter in accordance with the invention.
Figures 2, 8:
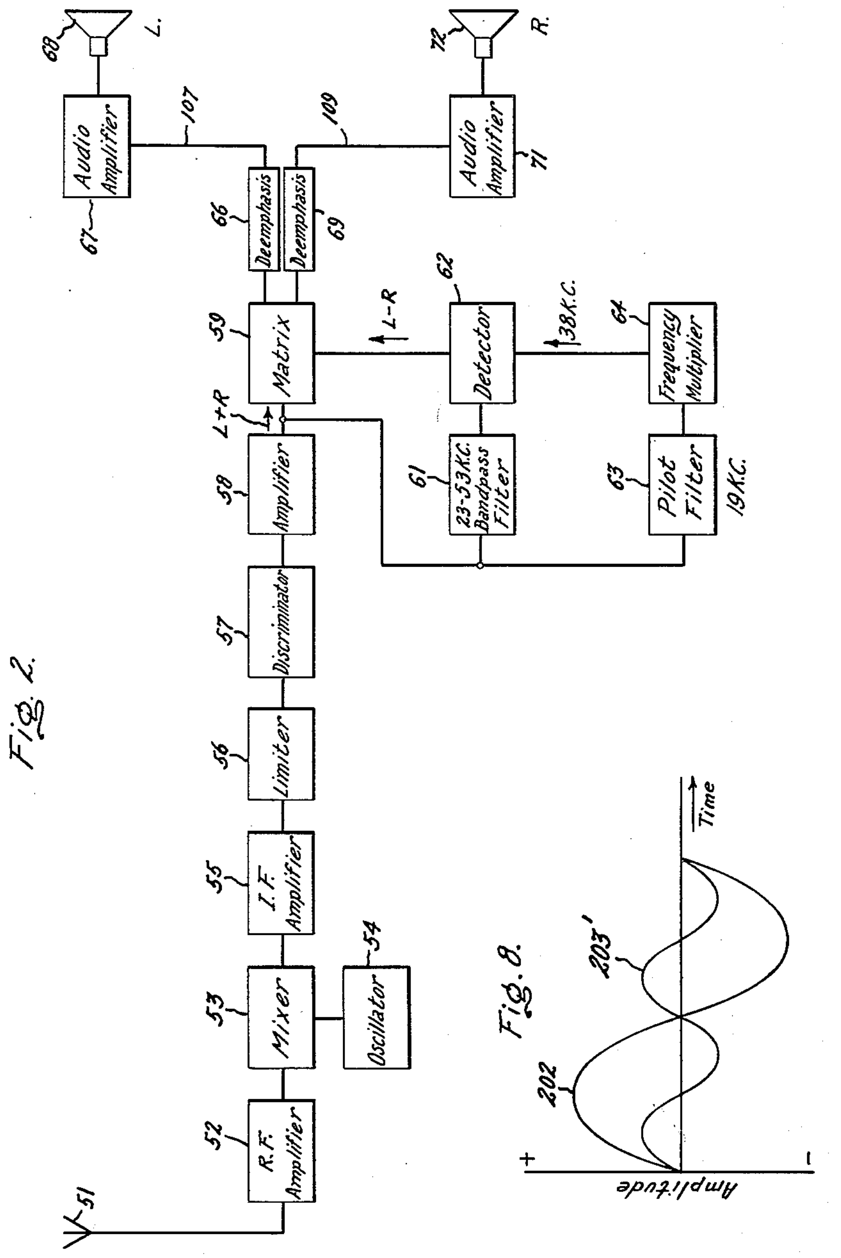
FIGURE 2 is an electrical diagram, in block form, of a preferred embodiment of a receiver in accordance with the invention.
Figure 9:
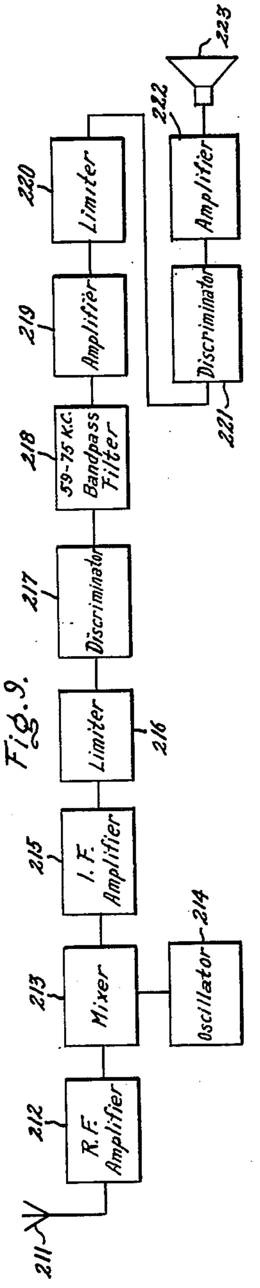
Figure 5:
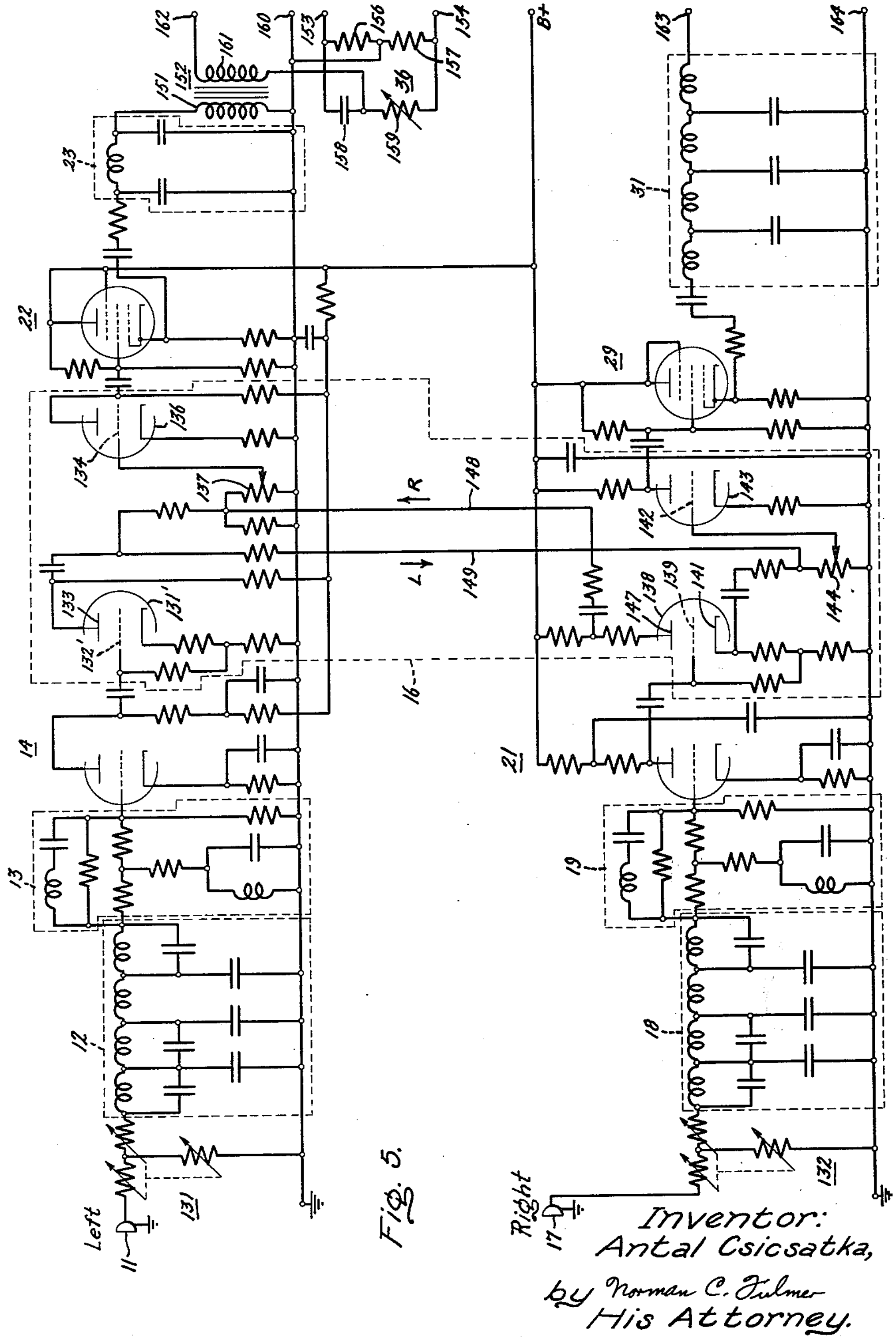
Figure 6:
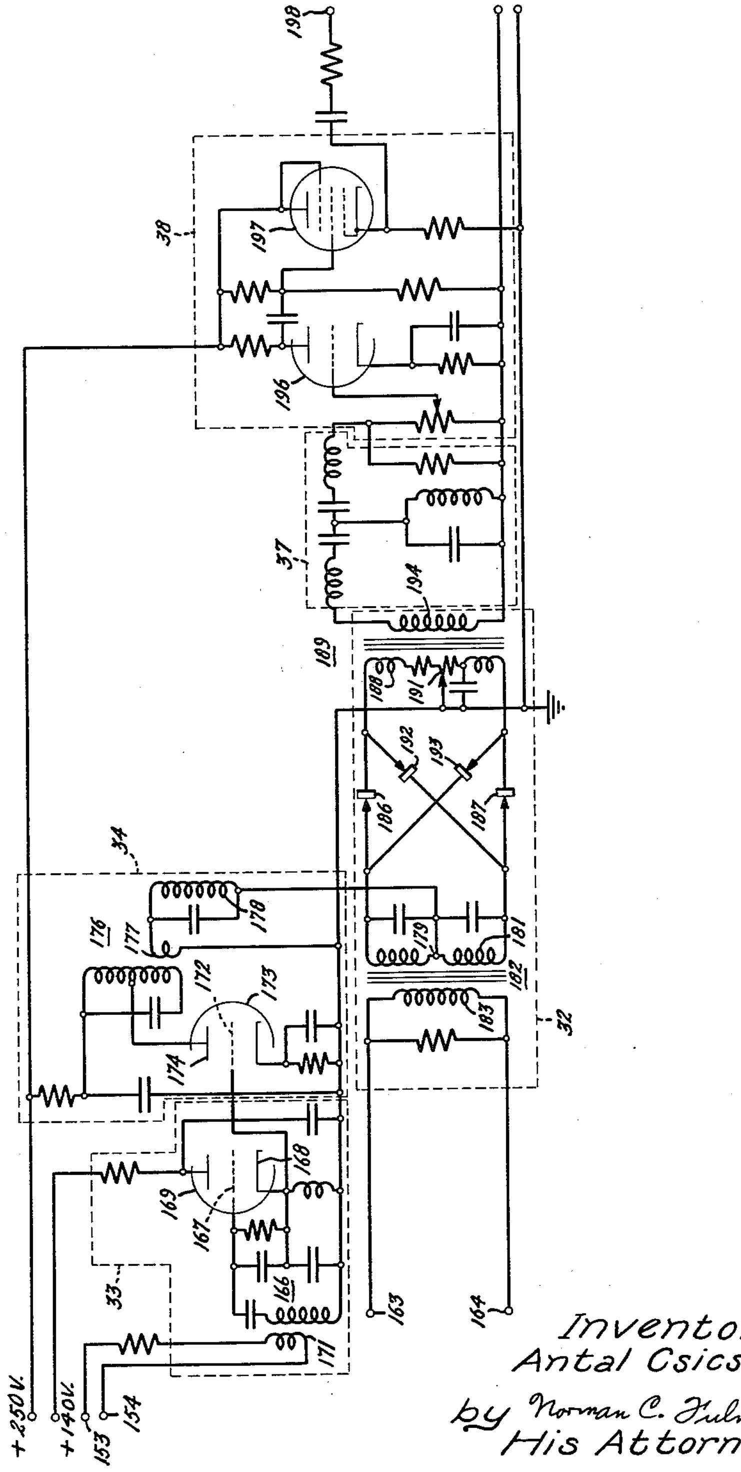

FIGURES 5 and 6 constitute an electrical schematic diagram of a portion of the transmitter of FIGURE 1;

FIGURE 7 is a graphical representation of frequency relationships of signals used in carrying out the invention;

FIGURE 8 is a graphical representation showing proper phasing of certain signals; and FIGURE 9 is an electrical diagram, in block form, of a receiver for receiving a commercial program signal which may, if desired, accompany the transmitted stereophonic signal.

A previously known stereophonic broadcasting system, over which the present invention is an improvement, employs a transmitter in which the L and R signals are electrically added together to provide an $L+R$ signal, and they also are electrically subtracted, one from the other, to provide an $L-R$ signal. A subcarrier signal is frequency modulated with the $L-R$ signal, and a carrier signal is frequency modulated with the $L+R$ signal and also is frequency modulated with the modulated subcarrier signal. This frequency modulated carrier signal is broadcast, and is received by suitably tuned receivers. Each receiver comprises a detector for demodulating the frequency-modulated carrier thereby producing an $L+R$ signal as well as the subcarrier modulated with the $L-R$ signal. This modulated subcarrier is demodulated to provide the $L-R$ signal. The $L+R$ and $L-R$ signals are electrically added to provide a "2L" signal, and are electrically subtracted to provide a "2R" signal. These latter signals are respectively fed to the L and R loudspeakers.

In a preferred embodiment of the system of the present invention, at the transmitter a subcarrier wave of given frequency is amplitude modulated by one of the signals to be transmitted, for example an $L-R$ signal. Upon being modulated, the subcarrier wave is suppressed and therefore is not transmitted, the intelligence, i.e. the $L-R$ signals, being represented by the sidebands in their respective relative amplitudes and frequency differences from the center or reference frequency. However, a pilot signal is provided at the transmitter, this pilot signal having a frequency which is a sub-harmonic of the frequency of the suppressed subcarrier frequency and lying in a frequency gap between the $L+R$ signal and the lower sideband of the modulated suppressed subcarrier. The amplitude of the pilot signal may be relatively smaller than that of the subcarrier wave. The carrier wave of the system is frequency modulated in accordance with this pilot signal, as well as in accordance with the $L+R$ signal and the suppressed-subcarrier amplitude-modulated $L-R$ signal. A phase-shifting means is provided in the transmitter for suitably adjusting the phase of the transmitted pilot signal with respect to the suppressed subcarrier wave. Each receiver, for stereophonic reception, is provided with filter means for separating the pilot signal from the received signals, and further is provided with means for producing a signal of subcarrier frequency from, or under the control of, the pilot signal, this reconstituted subcarrier wave having an amplitude relatively greater than that of the pilot signal and relatively at least as great as that of the original subcarrier wave. This reconstituted subcarrier wave is added to the $L-R$ suppressed subcarrier signal and the resulting signal is fed to a detector for obtaining the $L-R$ signal. An electrical matrix circuit then adds the $L+R$ and $L-R$ signals together to obtain the "left" signal, and subtracts the $L+R$ and $L-R$ signals one from the other to obtain the "right" signal. In the transmitter each of the L and R signals is preemphasized to relatively increase the amplitude of the higher frequencies thereof, and each receiver is provided with deemphasis networks after the aforesaid matrix circuit for relatively decreasing the amplitude of the higher frequencies thereof to reconstitute the L and R signals substantially as they were before being preemphasized.

It is found that the invention provides a new and improved transmitter and receiver which together constitute a stereophonic broadcasting system for achieving the objects named above, as will be more fully described hereinafter.

In the transmitter of FIGURE 1, a microphone 11 is positioned for picking up sound for the left-hand or "L" signal channel, and the electrical signal thereof is successively fed through a low pass filter 12, a preemphasis network 13, and an amplifier 14, to a matrix circuit 16.

A microphone 17 is positioned for picking up sound for the right-hand or "R" signal channel, and the electrical signal thereof is successively fed through a low pass filter 18, a preemphasis network 19, and an amplifier 21, to the matrix circuit 16. The microphones 11 and 17 can, of course, be replaced by suitable program sources such as phonographs and tape recorders. The low pass filters 12 and 18 preferably have cut-off frequencies of 15,000 cycles per second, and the preemphasis networks 13 and 19 preferably have time constants of 75 microseconds. The matrix circuit 16 produces a sum $(L+R)$ signal of the L and R signals and also produces a difference $(L-R)$ signal of the L and R signals and may comprise, for example, interconnected amplifiers as will be described with reference to FIGURE 5. These particular different arithmetical combinations of the stereophonically related L and R signals are used as follows.

The $L+R$ signal from the matrix circuit 16 is successively fed through an amplifier 22 and a time delay network 23, to a frequency modulation modulator 24. The network 23 has a time delay equal to the time delay of a bandpass filter 37, to be described hereinafter. An oscillator 26, having a frequency of 100 kilocycles per second, for example, is connected to the frequency modulation modulator 24 as another input thereto. The output of the frequency modulation modulator 24 is connected, via one or more frequency multipliers 27, to the input of a second frequency modulation modulator 28 where the $L-R$ signal information is added as a further frequency modulation.

The $L-R$ signal from the matrix circuit 16 is successively fed through an amplifier 29 and a time delay network 31, to the input of a balanced amplitude modulator 32 where it is used to modulate a subcarrier wave. The network 31 has a time delay such as to equalize the time of arrival of the input signals to the FM modulator 28. A master oscillator 33, having a frequency of 19 kilocycles per second, for example, is connected via a frequency multiplier 34 to provide a subcarrier wave, to the balanced modulator 32. Preferably, the frequency multiplier 34 is a doubler, which converts the 19 kc. pilot signal to a supersonic 38 kc. subcarrier signal frequency. The master oscillator 33 also is connected, via a phase shift network 36, to the same input of the frequency modulation modulator 24 to which the output of the time delay network 23 is connected, so that the 19 kc. pilot signal modulates the 100 kc. signal of the oscillator 24. The balanced amplitude modulator 32 inherently suppresses the subcarrier or center frequency of 38 kc., and the output of the balanced amplitude modulator 32, comprising the $L-R$ sidebands, is connected, via a band pass filter 37 having a band-pass frequency range of 23,000 cycles per second to 53,000 cycles per second, for example, and via an amplifier 38, to an input of the second frequency modulation modulator 28 where the $L-R$ sidebands frequency modulate the output of the modulator 24. As shown in FIG. 7, the $L-R$ sidebands extend plus and minus 15 kc. from the 38 kc. frequency of the suppressed subcarrier wave, and thus occupy a total frequency band of 23 kc. to 53 kc. The output of the second frequency modulation modulator 28 is connected, via a frequency multiplier 41 and a power amplifier 42, to a transmitting antenna 43. In lieu of radio-wave transmission through space, the transmission could be accomplished via wires or any other suitable medium.

It will thus be seen that the signal that is broadcast comprises, as shown in FIG. 7, a first frequency band of the modulation sidebands of a difference combination of electrical signals amplitude modulated on a suppressed carrier wave, a second frequency band of a sum combination of these electrical signals lower in frequency than the modulated difference combination thereof and separated therefrom by a frequency gap, and a pilot signal having a frequency lying in this frequency gap, the pilot signal being at a subharmonic frequency of that of the suppressed carrier wave and having an amplitude relatively smaller than that of the subcarrier wave before being suppressed.

Figure 3:
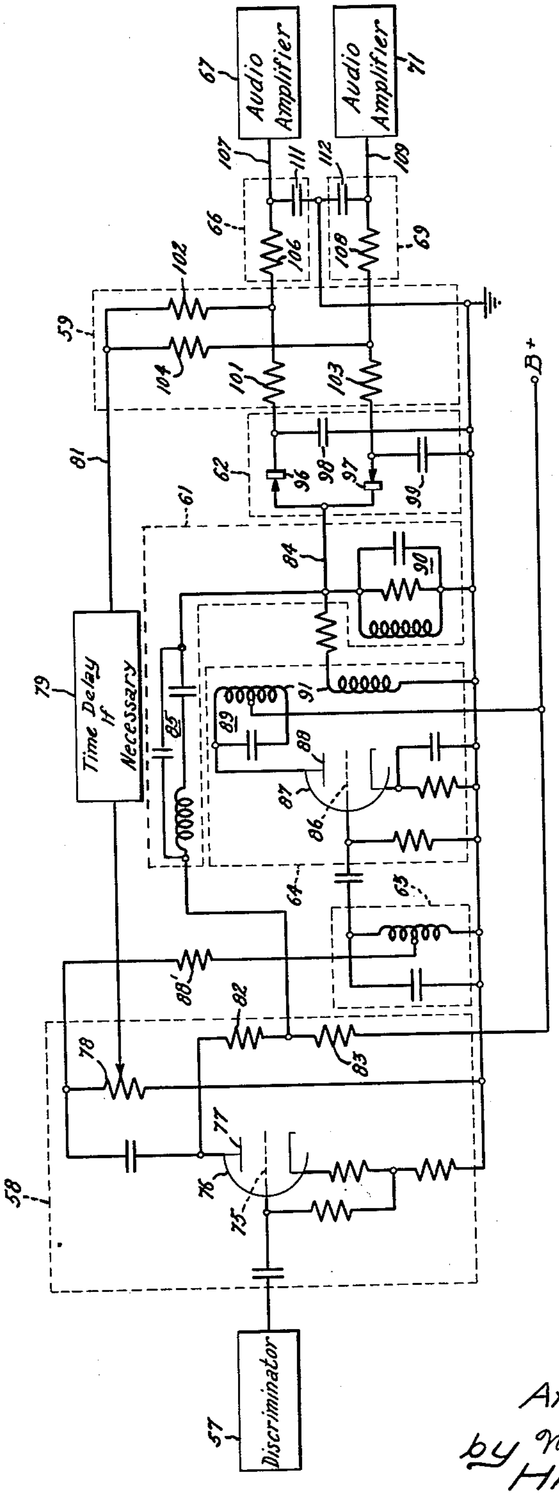
FIGURES 3 and 4 are electrical schematic diagrams of alternative circuits for use in the receiver of FIGURE 2.
Figure 4:
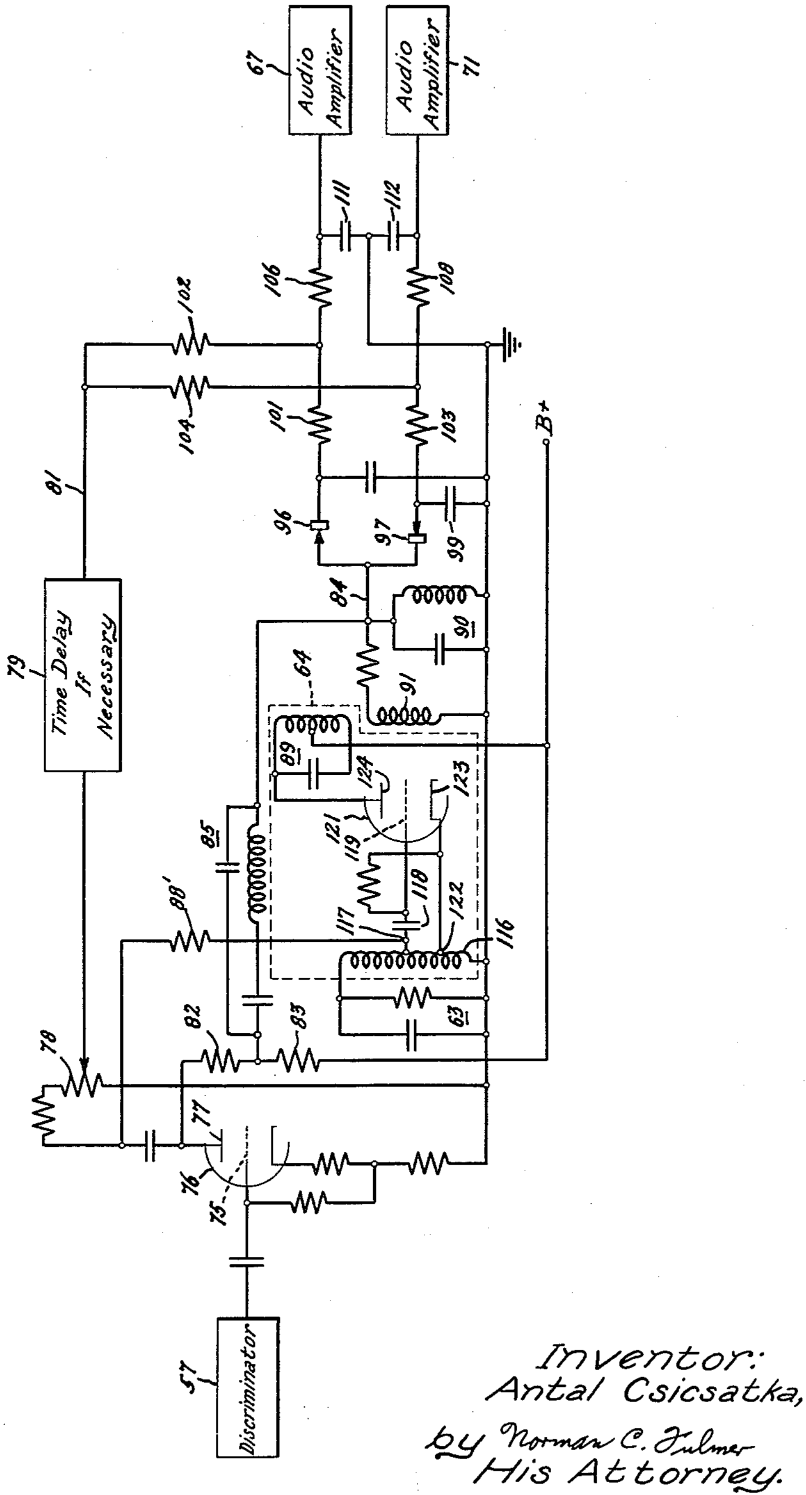

In the receiver shown in FIGURE 2, a receiver antenna 51 is connected, via a radio-frequency amplifier 52, to a mixer 53 to which a local oscillator 54 is connected. The output of the mixer 53 is connected, via an intermediate frequency amplifier 53 and a limiter 56, to a discriminator 57. The receiver thus far described is a conventional frequency modulation receiver, the discriminator 57 being of sufficiently good quality to pass modulation frequencies as high as 53 kc. Preferably, an amplifier 58 is connected to the output of the discriminator 57. The output of the amplifier 58, which comprises the $L+R$ signal, is fed to a matrix circuit 59, where the $L+R$ signal is utilized as will be described. The output of the amplifier 58 also is connected, via a band pass filter 61 having a frequency pass range of 23,000 to 53,000 cycles per second, to a detector 62 and also is connected, via a pilot signal filter 63 for passing the pilot frequency of 19,000 cycles per second, and via a frequency multiplier 64, to the detector 62. The frequency multiplier 64 has the same frequency multiplication factor as does the frequency multiplier 34 at the transmitter, and may comprise a frequency doubler circuit as shown in FIGURE 3, or a synchronous oscillator circuit as shown in FIGURE 4, which will be described in detail hereinafter. The frequency multiplier 64 functions to provide a frequency reconstituted subcarrier wave for combining with the $L-R$ sidebands so that the detector 62 can demodulate the modulated $L-R$ signal. The aforesaid reconstituted subcarrier wave functions as the required sideband reference wave that is the wave to which the sidebands are referred in translating them to an audio range of frequencies representing their respective frequency differences from the reference wave.

The output of the detector 62, which comprises the $L-R$ signal, is fed to the matrix 59. The matrix 59 may comprise a resistor network, as shown in FIGURES 3 and 4, and reproduces the L and R signals by properly combining the $L+R$ and $L-R$ signals as will be described. The L signal is applied, via a deemphasis network 66 and an audio amplifier 67, to a left-hand loudspeaker 68 which is located relatively to the left of listeners. The R signal is applied, via a deemphasis network 69 and an audio amplifier 71, to a right-hand loudspeaker 72 which is located relatively to the right of listeners. The deemphasis networks 66 and 69 have time constants of 75 microseconds, corresponding to the time constants of the preemphasis networks 13 and 19 at the transmitter.

Now referring to FIGURE 3, which shows circuit details of the blocks 58–69 of FIGURE 2, the signal from the discriminator 57 is applied to a control electrode 75 of an amplifier tube 76 which is in the amplifier 58. This signal from the discriminator 57 is a composite signal, as shown in FIG. 7, including frequency components in the form of the $L+R$ signal combination 201, the $L-R$ signal combination in the form of sidebands 203 related to a given center or reference frequency which is the frequency of the suppressed subcarrier wave at 38 kc., and the pilot signal 202. An output electrode 77 of the tube 76 provides an amplified output signal which is applied, via an amplitude adjusting potentiometer 78 and a time delay network 79, if necessary to equalize signal phasing, to the $L+R$ signal input line 81 of the matrix 59.

The output signal from the amplifier device 76 is attenuated by a network of resistors 82, 83 and is applied via the bandpass filter 61, to the input 84 of the detector 62. The bandpass filter 61 is shown as comprising a series-parallel resonant circuit 85 and a parallel resonant circuit 90, these circuits being tuned to provide a 23 to 53 kc. bandpass filter for the $L-R$ modulated suppressed-carrier signal.

The output signal of the amplifier tube 76 also is fed, via a resistor 88′, to the pilot signal filter 63, which is shown as comprising a parallel resonant circuit tuned to the pilot signal frequency of 19 kc. The output of filter 63 is coupled to the input electrode 86 of an amplifier tube 87 having an output electrode 88 connected to a tuned circuit 89 which is tuned to double the frequency of the pilot signal, viz. to 38,000 cycles per second, whereby the frequency doubler 64 provides an amplified output signal that is double the frequency of the pilot signal. This frequency-doubled signal is applied, via a winding 91 inductively coupled to the coil of the tuned circuit 89, to the input 84 of the detector 62.

The detector 62 comprises a pair of rectifiers 96, 97 connected to the input 84 with opposite polarities, as shown. Filter capacitors 98 and 99 are respectively connected between the output electrodes of the detector rectifiers 96 and 97, and electrical ground. The matrix circuit 59 comprises resistors 101 and 102 connected in series between the matrix input 81 and the output electrode of the rectifier 96, and further comprises resistors 103 and 104 connected in series between the matrix input 81 and the output electrode of rectifier 97.

The de-emphasis network 66 comprises a resistor 106 connected between the junction of the resistors 101 and 102 of the matrix 59 and an output connection 107 of the de-emphasis network 66. The de-emphasis network 69 comprises a resistor 108 connected between an output connection 109 thereof and the junction of the resistors 103 and 104 of the matrix 59. Capacitors 111 and 112 are respectively connected between electrical ground and the output connections 107 and 109. The output connections 107 and 109 of the de-emphasis networks 66 and 69 are respectively connected to the inputs of amplifiers 67 and 71.

FIGURE 4, insofar as it is similar to the circuit of FIGURE 3, contains the same reference numerals as does FIGURE 3. The circuit of FIGURE 4 differs from that of FIGURE 3 in that the frequency multiplier 64 comprises a synchronous oscillator instead of a frequency doubler. The synchronous oscillator circuit comprises an oscillator coil 116 which also functions as part of the pilot signal filter 63, and which is provided with a tap 117 which is connected, via a blocking capacitor 118, to an input electrode 119 of an amplifier tube 121. Another tap 122 on the oscillator coil 116 is connected to another electrode, for example a cathode 123, of the tube 121. An output electrode 124 of the tube 121 is connected to a tuned circuit 89 which is tuned to twice the frequency of the pilot signal, viz. to 38,000 cycles per second. The principles of operation of synchronous oscillators are well known and hence need not be explained in detail. The remaining circuits of FIGURE 2 which are not shown in detail in FIGURES 3 and 4, are conventional circuits well known to those skilled in the art.

FIGURES 5 and 6 together form a schematic diagram of a portion of the transmitter of FIGURE 1, this portion including the elements of FIGURE 1 from the microphones 11 and 17 to the time delay network 23 and the amplifier 38.

A variable attenuator 131 is shown connected between the microphone 11 and the low pass filter 12, and a second variable attenuator 132 is shown connected between the microphone 17 and the low pass filter 18. These variable attenuators permit relative amplitude adjustment of the L and R signals that are obtained from the microphones 11 and 17. The design and construction of the low pass filters 12 and 18, the pre-emphasis networks 13 and 19, and the amplifiers 14 and 21, is well known to those skilled in the art and will not be discussed in detail.

The matrix circuit 16 comprises a two-stage amplifier for the L channel, and a two-stage amplifier for the R channel. The two-stage L channel-amplifier comprises a first amplifier tube 131′ having an input electrode 132′ connected to receive the L signal from the output of the amplifier 14, and having an output electrode 133 from which the output signal is derived and applied to the input electrode 134 of a second amplifier tube 136, via a gain control potentiometer 137.

In the two-stage R-channel amplifier of the matrix circuit 16, there is provided a first amplifier tube 138 having an input electrode 139 connected to receive the output signal from the amplifier 21. An output signal is derived from the cathode 141 of the amplifier tube 138, and is applied to the input electrode 142 of the second amplifier tube 143 via a gain control potentiometer 144. An output signal from the anode 147 of tube 138 is applied, via a connection 148, to the potentiometer 137 of the L-channel amplifier, and the output signal from the anode 133 of the L-channel amplifier tube 131 is applied, via a connection 149, to the potentiometer 144 of the R-channel amplifier.

Since the L signal which is applied to the potentiometer 137 is obtained from the anode of tube 131, and since the R signal that is applied to the potentiometer 137 is obtained from the anode 147 of the tube 138, these L and R signals are in phase, and hence become added together at the potentiometer 137 to provide an $L+R$ signal which is amplified in the amplifier tube 136. Since the L signal that is applied to the potentiometer 144 is obtained from the anode 133 of tube 131, and since the R signal that is applied to the potentiometer 144 is obtained from the cathode 141 of tube 138, these L and R signals are 180° out of phase, and hence the R signal becomes subtracted from the L signal at the potentiometer 144 thereby providing the $L-R$ signal, this $L-R$ signal being amplified in the amplifier tube 143.

The $L+R$ signal from the output of the amplifier tube 136 is fed through a cathode follower amplifier stage 22, and through the time delay network 23, which is shown as comprising a pi network, to the primary winding 151 of a transformer 152.

The phase shifting network 36 is shown as comprising a conventional bridge circuit having input terminals 153 and 154, there being a first branch of resistors 156 and 157 connected in series between the terminals 153 and 154, and a second branch comprising a capacitor 158 and a variable resistor 159 connected in series across the terminals 153 and 154. The output of the phase shift network 36 is obtained from between the junction of the resistors 156 and 157, this output being electrically grounded at a terminal 160, and the junction of the capacitor 158 and the variable resistor 159, this output being connected to the lower end of the secondary winding 161 of the transformer 152. The upper end of the secondary winding 161 is connected to the frequency modulation modulator 24 of FIGURE 1, at terminal 162.

The $L-R$ output signal from the amplifier tube 143, is fed through a cathode follower amplifier 29, and through a time delay network 31, to a terminal 163. A terminal 164 is an electrically grounded common terminal of the time delay network 31 and the R-channel circuits. The time delay network 31 is shown as comprising a plurality of network sections, in a well known manner.

As shown in FIGURE 6, the master oscillator 33 comprises a resonant circuit 166 which is tuned to the 19 kc. frequency of the master oscillator, and which is connected between a control grid 167 and a cathode 168 of an amplifier tube 169 in a manner providing positive feedback so that the circuit oscillates at a frequency of 19 kc. Alternatively, a crystal controlled oscillator could be used. The 19 kc. signal is applied to the input terminals 153 and 154 of the phase shift network 36, by means of a winding 171 inductively coupled to the coil of the resonant circuit 166.

A 19 kc. signal from the master oscillator 33 is applied, from the cathode 168 of the tube 169, to the control grid 172 of an amplifier tube 173, the anode 174 of this tube being connected to a resonant circuit 176 that is tuned to twice the frequency of the master oscillator 33, or 38 kc. The 38 kc. signal thus produced in the resonant circuit 176 is coupled, via a coil 177 which is inductively coupled to the coil of the resonant circuit 176, and via a filter network 178, to the center tap 179 of the secondary 181 of a transformer 182 located in the balanced modulator 32. A primary winding 183 of the transformer 182 is connected across the output terminals 163 and 164 of the time delay network 31.

The ends of the secondary winding 181 are connected, via rectifiers 186 and 187 connected to have equal polarities, to the ends of a primary winding 188 of an output transformer 189. Preferably, the primary winding 188 is provided with an adjustable potentiometer 191 at the center thereof, which is useful in achieving exact balancing of the circuit. A rectifier 192 is cross-coupled between opposite ends of the windings 181 and 188, and another rectifier 193 is cross-coupled between the remaining ends of the windings. The rectifiers 192 and 193 are connected to have equal polarities, as shown. The balanced modulator 32 functions, in a well known manner, to provide at the output transformer 189 a signal comprising the $L-R$ signal (applied from the terminals 163 and 164) amplitude modulated on the 38 kc. subcarrier signal (supplied to the modulator 32 from the frequency multiplier 34), the 38 kc. subcarrier frequency being inherently suppressed in the balanced modulator 32. The subcarrier preferably is suppressed to a value less than one percent of the modulation of the main carrier.

The $L-R$ modulated suppressed subcarrier signal is supplied from the secondary winding 194 of the transformer 189, to the band pass filter 37 which is designed and constructed in conventional manner to pass a frequency bandwidth from 23 kc. to 53 kc.

The amplifier 38 is shown as comprising a two-stage arrangement of a first amplifier tube 196 having an anode output, and a second amplifier tube 197 connected as a cathode follower, the output signal thereof being derived at a terminal 198, which is connected to an input of the FM modulator 28 of FIGURE 1. The circuits represented by boxes in FIGURE 1, and not shown in detail in FIGURES 5 and 6, are conventional circuits well known to those skilled in the art. Certain circuit elements such as biasing resistors, blocking capacitors, etc. which have been shown but not described, are conventional elements well known to those skilled in the art. While tubes are shown as the amplifier devices in the transmitter and receiver circuits, transistors or other suitable devices may be used instead.

The invention thus far described functions as follows, with reference to FIGURE 7. The $L+R$ signal constitutes a band of audio frequency signals, represented by 201 in FIGURE 7, extending between zero and 15 kilocycles per second, and is applied to the FM modulator 24 at the point 162, along with the pilot signal of 19 kc., represented by the numeral 202 in FIGURE 7 and obtained from the master oscillator 33. In the modulator 24, the $L+R$ signal and the pilot signal are frequency modulated onto a carrier wave supplied by the oscillator 26 and having a frequency, for example, of 100 kc. The modulated output signal of the modulator 24 is multiplied in frequency by the one or more multipliers 27, and acts, in effect, as a carrier wave for the final frequency modulator 28.

The $L-R$ signal, amplitude modulated in the modulator 32 onto the 38 kc. subcarrier which is then suppressed, results in a band of frequencies represented by the numeral 203 in FIGURE 7, and comprises an upper side band extending 15 kc. above the 38 kc. subcarrier frequency, and a lower side band extending 15 kc. below the 38 kc. subcarrier frequency, the overall frequency range of this signal thus being from 23 kc. to 53 kc. This signal, after passing through the bandpass filter 37 and amplifier 38, is applied to the frequency modulator 28 where it is frequency modulated onto the frequency modulated signal obtained from the frequency modulator 24. The resulting output signal of the frequency modulator 28, is multiplied in frequency by the multiplier 41, and fed to the transmitting antenna 43 via a power amplifier 42. The frequency multiplication of the multipliers 27 and 41 may be such that the center frequency of the signal transmitted from the antenna 43 lies within the present frequency modulation broadcast band of 88 mc. to 108 mc. The transmitted signal may be considered to contain all of the frequency components shown in FIGURE 7, these frequency components all being present as modulation on a carrier that is shifted to a much higher frequency for purposes of broadcasting.

In the transmitted signal, the $L+R$ component "nestles" with the $L-R$ component, i.e., one is maximum when the other is minimum, and vice-versa. Because of this, practically full main carrier frequency deviation is obtained for both the main channel and the subchannel signal. The amplitude of the pilot signal component 202 need be only sufficient to produce about 8 or 10 percent of the main carrier modulation. Each of the transmitted $L+R$ and $L-R$ signal bands includes the full audible frequency range of 0 to 15 kc.

The operation of the receiver will now be described, with reference to FIGURES 2, 3 and 4. The elements 52 through 57 are conventional stages found in frequency modulation receivers and function in the conventional manner whereby the output of the discriminator 57 will be the signal components substantially as shown in FIGURE 7 and described hereinbefore, i.e., the $L+R$ signal 201, the pilot signal 202, and the $L-R$ sideband signals 203. The $L-R$ sideband signals 203 pass through the bandpass filter 61 to the detector 62. A restored subcarrier signal of 38 kc., which functions as a sideband reference wave, also is applied to the detector 62, from the frequency multiplier 64. The pilot signal, of 19 kc., passes through the pilot filter 63 to the frequency multiplier 64, wherein the pilot signal actuates or controls the 38 kc. output signal of the frequency multiplier 64. The detector 62 detects the $L-R$ sideband signals 203 and, in the detector 62 shown in each of FIGURES 3 and 4, each of the rectifiers 96 and 97 produces a demodulated $L-R$ signal, but of opposite polarity. More specifically, the rectifier 96 feeds an $L-R$ signal through the resistor 101 of the matrix 59, and this $L-R$ signal is combined with the $L+R$ signal that is applied through the resistor 102, thereby producing a 2L signal which is fed through the deemphasis network 66, and the audio amplifier 67, to the loudspeaker 68 which is arranged at the left of listeners. The rectifier 97, on the other hand, demodulates the $L-R$ signal component 203 in reverse phase with respect to the action of the rectifier 96, thereby producing an $R-L$ signal which is applied through the resistor 103 of the matrix 59 and combined with the $L+R$ signal supplied through the resistor 104. The results is a 2R signal which is applied, through the deemphasis network 69 and audio amplifier 71, to the R loudspeaker 72 which is positioned to the right of listeners. For the sake of completeness, it should be mentioned that the time delay circuit 79 and the matrix 59, plus the interconnecting wiring, filter out the pilot signal and $L-R$ modulation components so that only the $L+R$ signal is applied through the resistors 102 and 104 of the matrix 59 for mixing with the $L-R$ and $R-L$ signals produced by the rectifiers 96 and 97.

The time delay circuits 23 and 31 in the transmitter, and the time delay circuit 79 in the receiver, need be provided only if necessary to equalize the time of arrival of signals in the circuits involved. The pre-emphasis networks 13 and 19 in the transmitter, and the de-emphasis networks 66 and 69 in the receiver, correspond to the pre-emphasis and de-emphasis networks normally used in monaural broadcasting, the pre-emphasis circuits functioning to boost the amplitude of the higher frequencies for transmission of the signal, and the de-emphasis networks functioning to attenuate these higher frequencies in order to restore the frequency response characteristics of the signal to its original character.

An important advantage is achieved by the invention because, instead of transmitting the subcarrier frequency of 38 kc., this subcarrier signal is suppressed and is not transmitted; in its place, the half-frequency pilot signal 202 of 19 kc., is transmitted. Since the pilot signal 202 lies in an 8 kc. frequency gap and has a 4 kc. separation between each of the $L+R$ component or band 201 and the the $L-R$ component or band 203, the pilot filter 63 in the receiver may be relatively simple, and considerably more simple than would be required for separating out the subcarrier signal if it were transmitted. The simple pilot signal filter 63 permits the pilot signal 202, but not any other signals, to actuate the frequency multiplier 64. By this technique, the transmitted pilot signal 202 may have a relatively low amplitude, but the reconstituted subcarrier signal, as produced by the frequency multiplier 64, may have a relatively large amplitude, thereby minimizing sub channel distortion, increasing the efficiency and linearity of the sub channel detector 62, improving the accuracy of the matrixing action in the matrix 59, and reducing phase shift problems.

To achieve optimum functioning of the system, the phase shift network 36 should be adjusted so that the 19 kc. pilot signal 202 crosses the times axis at times when the $L-R$ subcarrier component 203′, at 38 kc., crosses the time axis and hence is at its minimum or zero value, as illustrated graphically in FIGURE 8. As shown, the subcarrier component 203′ crosses the time axis with a positive slope simultaneously with each crossing of the time axis by the pilot signal 202. For best results, this phasing should be set with an accuracy of plus or minus ten degrees.

The transmitted stereophonic signal, in accordance with this invention, can be received as a monaural signal by a conventional monaural frequency-modulation receiver, in which event the $L+R$ signal, which lies in the frequency range of zero to 15 kc. after demodulation occurs in the receiver, will be amplified and fed to the monaural loudspeaker in the normal manner.

In the stereophonic broadcasting system of this invention, a conventional high-quality monaural frequency modulation tuner or receiver can be readily adapted, by means of a simple and inexpensive adapter unit, for stereophonic reception. The simple adaptor comprises only a single tube, as shown in FIG. 3 for example, having one section to function as the amplifier 58 and having a second section for achieving frequency doubling in the frequency multiplier stage 64, plus a pair of semiconductor rectifiers 96 and 97, and the simple filter networks 61 and 63, in addition to the four resistors in the matrix 59. The discriminator 57 of the receiver must be capable of passing the signals to 53 kc., as shown in FIGURE 7.

Other advantageous results achieved by the present invention are as follows. There is an increased total useful deviation for the frequency modulation of the main channel and the subchannel of the transmitted signals, because of the carrier being suppressed. This improves the signal to noise ratio of the system. Also, with the relatively high amplitude ratio of the reinserted subcarrier to the modulation sidebands, the dynamic balance of the received sum and difference signals is more stable. Furthermore, at the FM discriminator the pilot signal is accompanied by less noise at its frequency than would be the case if the higher-frequency subcarrier signal were transmitted and appeared at the FM discriminator. These features of the invention provide a stereophonic system in which the acoustical reproductions of the two stereo signals are of equally high fidelity, thus enhancing the listening quality of stereophonic broadcasting.

While an embodiment of the invention has been described in which $L+R$ and $L-R$ signals are transmitted, the invention is not limited to such an arrangement, but can be employed advantageously for the transmission of any pair of signals, for example the L and R signals.

If desired, a commercial program signal, such as is used to provide background music and announcements in stores and restaurants, can be broadcast along with the above-described stereophonic signals. To accomplish this, the transmitter is provided with an additional microphone 206, as shown in FIGURE 1, for picking up a commercial program such as music or advertising announcements. The microphone can, of course, be replaced with a tape or record player or any other suitable source of program material. The output of the microphone 206 is fed, via an audio amplifier 207, to an oscillator 208 which is arranged to be frequency modulated in accordance with the signal of the microphone 206. The center frequency of the modulated oscillator 208 may be 67 kc., and the total frequency deviation may be plus and minus 8 kc. from the center frequency. The modulated output of oscillator 208 is applied to the terminal 198 where it becomes applied to the FM modulator 28 and subsequently is broadcast from the antenna 43 as a component of the transmitted FM signal. In FIGURE 7, numeral 209 represents the 67 kc. center frequency of the oscillator 208, and numeral 210 represents the total frequency band, 59 to 75 kc. of the modulated commercial signal.

The commercial program signal may be received by a receiver as shown in FIGURE 9. This receiver comprises an antenna 211 connected, via a radio-frequency amplifier 212, to a mixer 213 to which an oscillator 214 also is connected. The output of the mixer 213 is connected, via an intermediate-frequency amplifier 215 and a limiter 216, to a discriminator 217. The receiver thus far described is conventional, it being understood that the discriminator 217 must have a sufficiently wide frequency bandpass characteristic to pass modulation frequencies as high as 75 kc. The output signal of the discriminator 217 is fed successively through a bandpass filter 218 having a frequency bandpass of 59 kc. to 75 kc., an amplifier 219, and a limiter 220, to a second discriminator 221 which functions to derive the commercial signal from the 67 kc. subcarrier 209. The commercial signal output of the discriminator 221 is fed, via an amplifier 222, to a loudspeaker system 223 which may comprise a plurality of loudspeakers arranged in a store or restaurant or the like. If desired, the radio-frequency amplifier 212, the mixer 213, and the oscillator 214, may be fixed-tuned to the frequency of a particular broadcasting station.

While preferred embodiments of the invention have been shown and described, various other embodiments and modifications thereof will be apparent to those skilled in the art, and will fall within the scope of this invention as defined in the following claims.

What I claim as new and desire to secure by Letters Patent of the United States is:

1. A stereophonic broadcasting system comprising a transmitter and at least one receiver, said transmitter having sources of first and second stereophonically related audio frequency signals, means for adding the audio frequency signals together to obtain a sum combination thereof, means for subtracting said audio frequency signals one from the other to obtain a difference combination thereof, means for providing a main carrier wave, means for providing a subcarrier wave at a frequency sufficiently high so that when amplitude modulated by said difference combination there will be a frequency gap between the lower sideband of the modulated subcarrier wave and said sum combination, said frequency gap including a frequency that is one-half that of said subcarrier wave, means for amplitude modulating said subcarrier wave with said difference combination thereby providing said frequency gap, means for producing a pilot signal at a frequency equal to one-half that of said subcarrier wave and lying in said frequency cap, said frequency of the pilot signal being spaced from said sideband and said sum combination so as to permit the pilot signal to be separated from signals of said sideband and said sum combination by filter means in a receiver, means for suppressing said subcarrier wave, means for synchronizing the relative phases of said pilot signal and said subcarrier wave so that the subcarrier wave crosses the time axis with a positive slope simultaneously with each crossing of the time axis by the pilot signal, means to frequency modulate said main carrier wave in accordance with said sum combination of signals, said sidebands of the modulated suppressed subcarrier wave, and said pilot signal, said pilot signal modulation having an amplitude substantially smaller than would be that of said subcarrier wave if the subcarrier wave had not been suppressed, and means for broadcasting said frequency modulated main carrier wave, said receiver comprising means for receiving and demodulating the modulated main carrier wave to provide a composite signal including as frequency components thereof said sum combination of signals, said sidebands of the modulated suppressed subcarrier wave, and said pilot signal at a frequency lying in the frequency gap between said sidebands and said sum combination, filter means coupled to the output of said demodulating means and responsive to frequencies within said frequency gap for selectively passing said pilot signal from the composite signal, frequency multiplier means connected to the signal output of said filter means and adapted to provide a reconstituted subcarrier wave under the control of said pilot signal and having an amplitude greater than that of said pilot signal and at least as great as that of the original subcarrier wave, a detector connected to receive said reconstituted subcarrier wave and the modulated suppressed subcarrier sidebands and adapted to provide therefrom the difference combination of signals, and matrix means for adding the sum combination of signals and the difference combination of signals together to obtain said first audio frequency signal and for subtracting said sum combination of signals and said difference combination of signals one from the other to obtain said second audio frequency signal.

2. A multiplex transmission system comprising a transmitter and at least one receiver, said transmitter having terminals for input of two stereophonically related electrical signals, means for providing a reference wave alternating at a given frequency, signal combining means connected to said terminals and to said first-mentioned means, said signal combining means being adapted to utilize said reference wave to provide a first combination of said electrical signals lying in a first and upper frequency band and having sideband relation to the given frequency of said wave and being adapted also to provide a second combination of said electrical signals different from said first combination and lying in a second frequency band lower in frequency than said first frequency band, and spaced therefrom to provide a frequency gap therebetween, said frequency gap including a frequency that is one-half that of said given frequency, the combination of signals in one of said frequency bands representing a sum combination of the electrical signals and the combination of signals in the other of said frequency bands representing a difference combination of the electrical signals, means for providing a pilot signal at a frequency in said frequency gap equal to one-half that of said given frequency and being spaced from both of said first and second frequency bands so as to permit the pilot signal to be separated from the combination signals in said first and second frequency bands by frequency selective means in a receiver, and means to combine and transmit to said receiver as a single combination signal said first and second combinations of signals and said pilot signal, said receiver comprising means connected for application thereto of said pilot signal and said first and second combinations of signals, said last-named means being selectively responsive to the frequency of said pilot signal and adapted to derive at least one of said stereophonically related electrical signals from said first and second combinations of signals under the control of said pilot signal.

3. A circuit for producing a composite signal, comprising terminals for input of two signals, each of said signals lying in a given frequency band and respectively comprising a sum combination of two audio frequency signals and a different combination of said two audio frequency signals, said two audio frequency signals being stereophonically related, means for producing a carrier wave at a frequency sufficiently high so that when amplitude modulated by said difference combination of signals there will be a frequency gap between the lower sideband of the modulated carrier wave and the band of said sum combination of signals, said frequency gap including a frequency that is one-half that of said carrier wave, means for amplitude modulating said carrier wave with said difference combination of signals thereby providing said frequency gap, means for producing a pilot signal at a frequency equal to one-half that of said carrier wave and lying in said frequency gap, said frequency of the pilot signal being spaced from said sideband and said band of the sum combination of signals so as to permit the pilot signal to be separated from signals of said sideband and said band of the sum combination of signals by frequency selective means in a receiver, means for suppressing said carrier wave, and means for combining said sum combination of signals, said pilot signal, and the difference combination of signals as modulated on the suppressed carrier, to provide the aforesaid composite signal.

4. A circuit as claimed in claim 3, including means for synchronizing the relative phases of the pilot signal and the carrier wave so that said carrier wave crosses the time axis with a positive slope simultaneously with each crossing of the time axis by said pilot signal.

5. A circuit as claimed in claim 3, in which said means for producing a pilot signal produces a pilot signal having an amplitude such that the amplitude of the pilot signal in said composite signal is substantially smaller than would be the amplitude of the carrier wave in the composite signal if said carrier wave had not been suppressed.

6. A circuit comprising terminals for input of two stereophonically related electrical signals, means for providing an electrical wave alternating at a given frequency, signal combining means connected to said terminals and to said first-mentioned means, said signal combining means being adapted to utilize said electrical wave to provide a difference combination of said electrical signals lying in a first and upper frequency band and having sideband relation to the frequency of said wave and being adapted also to provide a sum combination of said signals lying in a second frequency band lower in frequency than said first frequency band, and spaced therefrom to provide a frequency gap therebetween, said frequency gap including a frequency that is one-half that of said given frequency, means for suppressing said electrical wave, means for providing a pilot signal at a frequency in said frequency gap, said frequency of the pilot signal being equal to one-half that of said given frequency and being spaced from both of said first and second frequency bands so as to permit the pilot signal to be separated from the signals in said first and second frequency bands by frequency selective means in a receiver, and means for combining the signals of said first and second frequency bands and said pilot signal to provide a single combination signal.

7. In a circuit for deriving at least one of two separate stereophonically related audio frequency electrical signals from a composite signal comprising upper and lower frequency bands of electrical waves separated by a frequency gap, one of said bands representing a sum combination of said two separate signals and the other of said bands representing a difference combination of said two separate signals, said electrical waves of the upper frequency band having sideband relation to a given frequency, and a pilot signal having a fixed frequency in said frequency equal to one-half of said given frequency and lying gap, the combination of means selectively responsive to frequencies within said frequency gap inclusive of said frequency of the pilot signal and adpted to provide a sideband reference wave of fixed frequency, means to apply to said selectively responsive means at least the portion of said signal combination including said pilot signal, and signal recovery means comprising means adapted to utilize said reference wave to provide at audio frequencies the combination of said signals represented by said separate upper band of frequencies for combination with said lower band combination to yield at least one of said signals, said signal recovery means being connected for application thereto of said reference wave and the electrical waves of said upper and lower frequency bands.

8. In a circuit for deriving at least one of first and second stereophonically related audio frequency signals from a composite signal including as frequency components thereof (*a*) an upper frequency band comprising a difference combination of said audio frequency signals in the form of electrical waves having sideband relation to a given frequency, (*b*) a lower frequency band comprising a sum combination of said signals lying in a frequency band lower in frequency than said upper frequency band and separated therefrom by a frequency gap, and (*c*) a pilot signal at a fixed frequency lying in said frequency gap and having a frequency equal to one-half of said given frequency, the combination of means selectively responsive to frequencies within said frequency gap inclusive of said frequency of the pilot signal and adapted to provide a sideband reference wave at said given frequency, means to apply to said selectively responsive means at least the portion of said signal combination including said pilot signal, and signal recovery means comprising means adapted to utilize said reference wave to provide at audio frequencies said difference combination of signals for combination with said sum combination to yield at least one of said signals, said signal recovery means being connected for application thereto of said reference wave and the electrical waves of said upper and lower frequency bands.

9. In a circuit for deriving a difference combination of stereophonically related audio frequency signals from a composite signal including as frequency components thereof (*a*) an upper frequency band comprising said difference combination of signals in the form of electrical waves having sideband relation to a given supersonic frequency, (*b*) a lower frequency band comprising a sum combination of said signals lying in an audio frequency band lower in frequency than said upper frequency band and separated therefrom by a frequency gap, and (*c*) a pilot signal at a fixed frequency lying in said frequency gap and having a frequency equal to one-half of said given frequency, means selectively responsive to frequencies within said frequency gap inclusive of said frequency of the pilot signal and adapted to provide a sideband reference wave at said given frequency, and means connected therewith for deriving said difference combination of signals from said upper frequency band under the control of said reference wave.

10. In a circuit for deriving at least one of first and second stereophonically related audio frequency signals from a composite signal including as frequency components thereof (*a*) the sidebands of a difference combination of said first and second audio frequency signals amplitude modulated on a suppressed carrier wave, (*b*) a sum combination of said first and second audio frequency signals lying in a frequency band lower in frequency than said sidebands and separated therefrom by a frequency gap, and (*c*) a pilot signal at a fixed frequency equal to one-half that of said suppressed carrier wave and which lies in said frequency gap, means selectively responsive to frequencies within said frequency gap inclusive of said frequency of the pilot signal for separating said pilot signal from said composite signal, means for reconstituting said carrier wave under the control of said pilot signal, and means for deriving said difference combination of signals under the control of said reconstituted carrier wave and for combining said sum combination of signals with said derived difference combination of signals to provide at least one of said first and second stereophonically related audio signals.

11. In a circuit for deriving first and second stereophonically related audio frequency signals from a composite signal including frequency components in the form of (*a*) the sidebands of a difference combination of said first and second audio frequency signals amplitude modulated on a suppressed carrier wave of given frequency, (*b*) a sum combination of said first and second audio frequency signals lying in a frequency band lower in frequency than said sidebands and separated therefrom by a frequency gap, and (*c*) a pilot signal at a fixed frequency equal to one-half that of said given frequency and which lies in said frequency gap, filter means connected to receive said composite signal and responsive to frequencies within said frequency gap for selectively passing said fixed frequency pilot signal, circuit means coupled to receive the pilot signal output of said filter means and comprising means under the control of said pilot signal output for reconstituting a wave of said given frequency, and means under the control of said reconstituted wave for deriving said difference combination of signals from said sidebands and for adding and subtracting said derived difference combination of signals to and from said sum combination of signals.

12. In a circuit for deriving at least one of first and second stereophonically related audio frequency signals from a composite signal including frequency components in the form of (*a*) the sidebands of a difference combination of said first and second audio frequency signals amplitude modulated on a suppressed carrier wave of given frequency, (*b*) a sum combination of said first and second audio frequency signals lying in a frequency band lower in frequency than said sidebands and separated therefrom by a frequency gap, and (*c*) a pilot signal at a frequency equal to one-half that of said suppressed carrier wave and which lies in said frequency gap, frequency multiplier means including a frequency selective circuit selectively responsive to frequencies within said frequency gap and responsive to said pilot signal for providing a sideband reference wave in the form of a wave at said given frequency under the control of said pilot signal, and circuit means coupled to receive said sidebands, said sum combination of signals and said reference wave, said circuit means comprising a reference wave control means for deriving at least one of said first and second audio frequency signals from said sidebands and said sum combination of signals under the control of said reference wave.

13. A circuit as claimed in claim 12, in which said frequency multiplier means provides a reconstituted carrier wave of said given frequency at an amplitude substantially greater than that of said pilot signal and at least as great as that of the original carrier wave.

14. In a circuit for deriving at least one of two separate stereophonically related audio frequency electrical signals from a composite signal including frequency components in the form of (*a*) the sidebands of a difference combination of said electrical signals amplitude modulated on a suppressed carrier wave of given frequency, (*b*) a sum combination of said electrical signals lying in a frequency band lower in frequency than said sidebands and separated therefrom by a frequency gap, and (*c*) a pliot signal at a fixed frequency equal to one-half that of said given frequency and which lies in said frequency gap, said pilot signal having an amplitude relatively less than that of the said wave of given frequency, frequency multiplier means including a frequency selective circuit selectively responsive to frequencies within said frequency gap and responsive to said pilot signal for providing a sideband reference wave at said given frequency under the control of said pilot signal and at an amplitude relatively greater than that of said pilot signal, and circuit means coupled to receive said sidebands, said sum combination of signals and said reference wave, said circuit means including means for deriving at least one of said separate electrical signals from said sidebands and said sum combination of signals under the control of said reference wave.

15. In a circuit for deriving at least one of two stereophonically related audio frequency electrical signals from a composite signal including frequency components in the form of (*a*) the sidebands of a difference combination of said two electrical signals amplitude modulated on a suppressed carrier wave of given frequency, (*b*) a sum combination of said two electrical signals lying in a frequency band lower in frequency than said sidebands and separated therefrom by a frequency gap, and (*c*) a pilot signal at a fixed frequency equal to one-half that of said given frequency and which lies in said frequency gap, first circuit means selectively responsive to frequencies within said frequency gap inclusive of said frequency of the pilot signal and adapted to provide a sideband reference wave of said given frequency, means to apply to said first circuit means at least the pilot signal portion of said composite signal, and second circuit means adapted to derive at least one of said electrical signals from said sidebands and sum combination of the composite signal under the control of said reference wave, said second circuit means being connected for application thereto of said reference wave and at least the sidebands and sum combination of the composite signal.

16. In a circuit for deriving at least one of two stereophonically related audio frequency electrical signals from a composite signal including frequency components in the form of (*a*) the sidebands of a difference combination of said two electrical signals amplitude modulated on a suppressed carrier wave of given frequency, (*b*) a sum combination of said two electrical signals lying in a frequency band lower in frequency than said sidebands and separated therefrom by a frequency gap, and (*c*) a pilot signal at a fixed frequency equal to one-half that of said given frequency and which lies in said frequency gap, a synchronous oscillator having an oscillatory input circuit selectively resonant at frequencies within said frequency gap inclusive of said frequency of the pilot signal and an oscillatory output circuit resonant at said given frequency, means to apply to said oscillatory input circuit at least the pilot signal portion of said composite signal, whereby a sideband reference wave at said given frequency is produced at said oscillatory output circuit, and circuit means adapted to derive at least one of said audio frequency signals from said upper and lower frequency bands of the composite signal under the control of said reference wave, said circuit means being connected for application thereto of said reference wave and at least said upper and lower frequency bands of the composite signal.

17. In a circuit for deriving first and second stereophonically related audio frequency signals from a composite signal including frequency components in the form of (*a*) the sidebands of a difference combination of said first and second audio frequency signals amplitude modulated on a suppressed carrier wave of given frequency, (*b*) a sum combination of said first and second audio frequency signals lying in a frequency band lower in frequency than said sidebands and separated therefrom by a frequency gap, and (*c*) a pilot signal at a fixed frequency equal to one-half that of said given frequency and which lies in said frequency gap, means selectively responsive to frequencies within said frequency gap inclusive of said frequency of the pilot signal and adapted to provide under the control of said pilot signal a sideband reference wave alternating at said given frequency, circuit means connected for application thereto of said reference wave, said upper frequency band, and said sum combination of signals, said circuit means including detector means having two output circuits and being adapted to provide a first one of said combinations of signals in relatively opposite electrical phases respectively at said two output circuits under the control of said reference wave, and means to apply the second one of said combinations of signals to said two output circuits, thereby causing said second combination of signals to add to said oppositely-phased first combinations of signals to produce said first and second stereophonically related audio frequency signals respectively at said two output circuits.

18. In a circuit for deriving stereophonically related audio frequency signals from a composite signal including frequency components in the form of (*a*) the sidebands of a difference combination of said audio frequency signals amplitude modulated on a suppressed carrier wave of given frequency, (*b*) a sum combination of said audio frequency signals lying in a frequency band lower in frequency than said sidebands of the modulated difference combination of audio frequency signals and separated therefrom by a frequency gap, and (*c*) a pilot signal at a fixed frequency equal to one-half that of said given frequency and which lies in said frequency gap, filter means responsive to frequencies within said frequency gap for selectively passing said pilot signal, frequency multiplier means for producing from said pilot signal a sideband reference wave of said given frequency, detector means connected to receive said reference wave and said difference combination sidebands and adapted to provide the difference combination of signals at audio frequencies, means connected to obtain said sum combination of signals from said composite signal, and a matrix connected to receive said sum and difference combinations of signals and for adding said sum and difference combinations of signals together to obtain one of said stereophonically related audio frequency signals and for subtracting said sum and difference combinations of signals one from the other to obtain another of said stereophonically related audio frequency signals.

19. In a circuit for deriving at least one of two separate stereophonically related audio frequency electrical signals from a composite signal comprising upper and lower frequency bands of electrical waves separated by a frequency gap, one of said bands representing a sum combination of said two separate signals and the other of said bands representing a difference combination of said two separate signals, said electrical waves of the upper frequency band having sideband relation to a given frequency, and a pilot signal having a fixed frequency equal to one-half of said frequency and lying in said frequency gap, the combination of means selectively responsive to frequencies within said frequency gap inclusive of said frequency of the pilot signal and adapted to provide a sideband reference wave of fixed frequency, means to apply to said selectively responsive means at least the portion of said signal combination including said pilot signal, and signal recovery means comprising means adapted to utilize said reference wave to provide at audio frequencies the combination of said signals represented by said upper band of frequencies and to combine therewith said lower band combination to yield at least one of said signals, said signal recovery means being connected for application thereto of said reference wave and the electrical waves of said upper and lower frequency bands.

References Cited in the file of this patent

UNITED STATES PATENTS

| | | |
|---|---|---|
| 1,773,901 | Kendall | Aug. 26, 1930 |
| 2,045,796 | Plebanski | June 30, 1936 |

(Other references on following page)

UNITED STATES PATENTS

| | | |
|---|---|---|
| 2,370,985 | Morrison | Mar. 6, 1945 |
| 2,515,619 | Weyers | July 18, 1950 |
| 2,530,825 | King | Nov. 21, 1950 |
| 2,619,547 | Ross | Nov. 25, 1952 |
| 2,681,445 | Guanella | June 15, 1954 |
| 2,698,379 | Boelens et al. | Dec. 28, 1954 |
| 2,773,125 | Armstrong | Dec. 4, 1956 |
| 2,776,429 | Olerud | Jan. 1, 1957 |
| 2,810,782 | Hester | Oct. 22, 1957 |
| 2,851,532 | Crosby | Sept. 9, 1958 |
| 2,871,292 | Base | Jan. 27, 1959 |

| | | |
|---|---|---|
| 2,879,335 | Base | Mar. 24, 1959 |
| 2,903,518 | Kahn | Sept. 8, 1959 |
| 2,912,492 | Haantjes et al. | Nov. 10, 1959 |
| 3,046,329 | Reesor | July 24, 1962 |

FOREIGN PATENTS

| | | |
|---|---|---|
| 120,269 | Australia | Aug. 9, 1945 |
| 150,405 | Australia | Mar. 5, 1953 |

OTHER REFERENCES

The Zenith G.E. Stereophonic Broadcasting System; Wireless World; January 1963, pp. 39–44.

UNITED STATES PATENT OFFICE
CERTIFICATE OF CORRECTION

Patent No. 3,122,610 February 25, 1964

Antal Csicsatka

It is hereby certified that error appears in the above numbered patent requiring correction and that the said Letters Patent should read as corrected below.

Column 2, line 24, for "signals" read -- signal --; column 8, line 54, for "results" read -- result --; column 9, line 10, strike out "the", first occurrence; column 10, line 74, for "cap" read -- gap --; column 13, lines 4 and 5, strike out "equal to one-half of said given frequency and lying" and insert the same after "frequency", second occurrence, in line 3, same column 13; same column 13, line 7, for "adpted" read -- adapted --; line 14, strike out "separate" and insert the same after "said", first occurrence in line 16, same column 13.

Signed and sealed this 8th day of December 1964.

(SEAL)
Attest:

ERNEST W. SWIDER
Attesting Officer

EDWARD J. BRENNER
Commissioner of Patents